United States Patent
Sethi et al.

(10) Patent No.: US 12,086,759 B2
(45) Date of Patent: Sep. 10, 2024

(54) ELECTRONIC DEVICE MANAGEMENT UTILIZING A DISTRIBUTED LEDGER

(71) Applicant: Dell Products L.P., Round Rock, TX (US)

(72) Inventors: Parminder Singh Sethi, Ludhiana (IN); Anannya Roy Chowdhury, Jamshedpur (IN); Anshul Saxena, Uttar Pradesh (IN)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 17/152,964

(22) Filed: Jan. 20, 2021

(65) Prior Publication Data
US 2022/0229915 A1    Jul. 21, 2022

(51) Int. Cl.
*G06Q 10/087* (2023.01)
*G06F 16/27* (2019.01)
*H04L 9/06* (2006.01)
*H04L 9/30* (2006.01)

(52) U.S. Cl.
CPC ........... *G06Q 10/087* (2013.01); *G06F 16/27* (2019.01); *H04L 9/0643* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 2009/0099867 | A1* | 4/2009 | Newman | G16H 40/20 |
| | | | | 705/2 |
| 2015/0143456 | A1* | 5/2015 | Raleigh | H04L 63/20 |
| | | | | 726/1 |
| 2017/0091678 | A1* | 3/2017 | Ko | G06Q 10/067 |
| 2017/0236094 | A1* | 8/2017 | Shah | H04L 9/0637 |
| | | | | 705/300 |
| 2018/0078843 | A1* | 3/2018 | Tran | G09B 19/0038 |
| 2018/0144292 | A1* | 5/2018 | Mattingly | G06F 16/903 |
| 2018/0284741 | A1* | 10/2018 | Cella | G06V 10/7784 |
| 2019/0026685 | A1* | 1/2019 | Chappell | G06Q 10/087 |
| 2019/0041835 | A1* | 2/2019 | Cella | G05B 19/4183 |
| 2019/0065733 | A1* | 2/2019 | Forehand | H04L 9/32 |
| 2019/0080284 | A1* | 3/2019 | Kim | G06Q 50/28 |

(Continued)

*Primary Examiner* — Fateh M Obaid
(74) *Attorney, Agent, or Firm* — Daly, Crowley, Mofford & Durkee, LLP

(57) ABSTRACT

In one aspect, an example methodology implementing the disclosed techniques includes receiving an input to register a device for tracking, the input comprising registration data specifying the device and one or more components in the device to register for tracking and a minimum acceptance criterion for each of the one or more components, the minimum acceptance criterion for a registered component defines a minimum threshold percentage of votes needed to approve a modification to the registered component. The method also includes recording the device identifier and the registration data related to the device in a device ledger, generating a rule execution set for the device ledger, the rule execution set comprising one or more rules pertaining to approval of requests to modify the device, and processing requests to modify the device or the one or more registered components in the device based on the specified minimum acceptance criterion and the rule execution set.

20 Claims, 7 Drawing Sheets

(56) References Cited

U.S. PATENT DOCUMENTS

| | | | |
|---|---|---|---|
| 2019/0261203 A1* | 8/2019 | Raleigh | H04L 47/803 |
| 2019/0332702 A1* | 10/2019 | Manamohan | G06F 11/3006 |
| 2019/0371102 A1* | 12/2019 | Prostko | G06V 30/422 |
| 2020/0007540 A1* | 1/2020 | Kawaguchi | H04L 9/0861 |
| 2020/0211000 A1* | 7/2020 | Narasimhan | G06Q 20/3678 |
| 2020/0226267 A1* | 7/2020 | Bengston | H04L 9/3239 |
| 2020/0267151 A1* | 8/2020 | Wells | H04L 9/50 |
| 2020/0294128 A1* | 9/2020 | Cella | G06Q 40/03 |
| 2020/0294133 A1* | 9/2020 | Cella | G06F 16/27 |
| 2020/0302449 A1* | 9/2020 | Wagner | G06V 20/80 |
| 2021/0126797 A1* | 4/2021 | Peng | H04L 9/3239 |
| 2021/0248523 A1* | 8/2021 | Wick | G06N 3/045 |
| 2022/0004984 A1* | 1/2022 | Goodwin | G06F 16/1834 |
| 2022/0014512 A1* | 1/2022 | Raleigh | H04L 63/20 |
| 2022/0027992 A1* | 1/2022 | Blevins | G06Q 20/3678 |

* cited by examiner

ELECTRONIC DEVICE MANAGEMENT UTILIZING A DISTRIBUTED LEDGER

FIELD

The disclosure generally pertains to electronic devices, and more particularly to techniques for securely tracking, requesting, and/or approving modifications to electronic devices.

BACKGROUND

Systems, such as computing devices and other electronic devices, may be constructed of many components. For example, a computer is typically comprised of many components or subparts—e.g., motherboard, memory card, video card, communication devices, host controllers (also known as host adapters or host bis adapters), hard disk drives (also known as hard drives or hard disks), etc. It is not uncommon for components in a system to be updated, removed, or replaced. Also, new components can be added to a system.

Being able to accurately track such systems, and the components included in these systems, may be important for a variety of reasons. For example, a company may desire an accurate accounting of its systems, and the components included in each system. To this end, the company may request the owners or persons responsible for the systems and the components contained in the systems to track and periodically provide an inventory of the location or whereabouts of their systems. Where a system contains components that are owned by or the responsibility of persons other than the person responsible for the system, the company may request the owners or persons responsible for these components to track and periodically audit the location or whereabouts of their components. However, since the last audit, a system or a component within a system may be relocated unbeknownst to the owner or person responsible. For example, a system may be removed from a lab without informing or obtaining authorization from the owner. As another example, a component in a system may be removed from the system without informing or obtaining authorization from the owner. In any case, the owners or responsible persons may have difficulty in tracking and auditing their systems and components. There is the additional risk that information contained in the removed systems and components may be compromised.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Embodiments of the concepts, techniques, and structures disclosed herein include management of electronic devices utilizing a distributed ledger. In accordance with certain of the embodiments disclosed herein, a device tracking system enables users to track electronic devices (sometimes referred to herein more simply as "devices" or "device" in the singular), including one or more components included in the devices, and allows modification of the tracked devices based on criteria defined by the users. The tracking and criteria-defined modification of a device is achieved by allowing a user who owns the device to specify rules that define the criteria for allowing modifications to the device.

In some embodiments, the system may utilize software defined locks to further control modification to registered devices. As an example, when a device and one or more components of the device are registered for tracking, the system may generate a software defined lock for the individual one or more components. A software defined lock generated for a component is configured to prevent modification (e.g., removal) of the component. Then, upon determining that a requested modification to the component is approved, the system can release the software defined lock generated for the component. For example, the system can send a signal to open the software defined lock, thus allowing the requested modification to the component.

In some embodiments, the system allows modification of a rule execution set generated for a registered device (i.e., a device that is being tracked) by consensus of the owners of the device and the components of the device that are registered to be tracked and an administrator of the system. In some such embodiments, the system generates or otherwise provides to the owners of the device and the components and the administrator a notification of any changes or attempted changes to the rule execution set. In this manner, the rule execution set is secured from external threats (e.g., an entity other than the owner of the device or component included in the device attempting to modify the rule execution set). These and other advantages, configurations, modifications, and embodiments will be apparent in light of this disclosure.

In accordance with one example embodiment provided to illustrate the broader concepts, systems, and techniques described herein, a computer implemented method to facilitate device tracking through use of a distributed ledger includes receiving, by a device tracking system, an input from a user to register a device for tracking, the input comprising registration data specifying the device and one or more components in the device to register for tracking and a minimum acceptance criterion for each of the one or more components, the minimum acceptance criterion for a registered component defines a minimum threshold percentage of votes needed to approve a modification to the registered component. The method also includes recording the device identifier and the registration data related to the device in a device ledger, generating a rule execution set for the device ledger, the rule execution set comprising one or more rules pertaining to approval of requests to modify the device, and processing requests to modify the device or the one or more registered components in the device based on the specified minimum acceptance criterion and the rule execution set.

In some embodiments, the method further includes generating a software defined lock for a component of the one or more components in the device, the software defined lock configured to prevent modification of the component.

In some embodiments, the registration data specifies one or more voting weights, and wherein processing requests to modify the device or the one or more registered components in the device is based on the specified one or more voting weights.

In some embodiments, the rule execution set indicates a minimum number of users that need to provide approval for any requested modification to the device.

In some embodiments, the rule execution set indicates whether a proxy voting feature is enabled.

In some embodiments, the rule execution set indicates whether an approve by submitting device specific information voting feature is enabled.

In some embodiments, the rule execution set indicates whether an approve by using provided link voting feature is enabled.

In some embodiments, the rule execution set indicates whether an approve by providing a one-time password (OTP) voting feature is enabled.

In some embodiments, the method further includes receiving, by the device tracking system, a request to remove a registered component from the device, receiving one or more votes either approving or disapproving the request to remove a registered component from the device and, in response to a determination to approve the request, updating the device ledger to reflect the approval of the request to remove a registered component from the device.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to receive an input from a user to register a device for tracking, the input comprising registration data specifying the device and one or more components in the device to register for tracking and a minimum acceptance criterion for each of the one or more components, the minimum acceptance criterion for a registered component defines a minimum threshold percentage of votes needed to approve a modification to the registered component. Execution of the instructions also causes the one or more processors to record the device identifier and the registration data related to the device in a device ledger, generate a rule execution set for the device ledger, the rule execution set comprising one or more rules pertaining to approval of requests to modify the device, and process requests to modify the device or the one or more registered components in the device based on the specified minimum acceptance criterion and the rule execution set.

In some embodiments, execution of the instructions further causes the one or more processors to generate a software defined lock for a component of the one or more components in the device, the software defined lock configured to prevent modification of the component.

In some embodiments, the registration data specifies one or more voting weights, and wherein processing requests to modify the device or the one or more registered components in the device is based on the specified one or more voting weights.

In some embodiments, the rule execution set indicates a minimum number of users that need to provide approval for any requested modification to the device.

In some embodiments, the rule execution set indicates one of whether an approve by submitting device specific information voting feature is enabled, whether an approve by using provided link voting feature is enabled, and whether an approve by providing a one-time password (OTP) voting feature is enabled.

In some embodiments, execution of the instructions further causes the one or more processors to receive a request to remove a registered component from the device, receive one or more votes either approving or disapproving the request to remove a registered component from the device and, in response to a determination to approve the request, update the device ledger to reflect the approval of the request to remove a registered component from the device.

According to another illustrative embodiment provided to illustrate the broader concepts described herein, a computer program product includes one or more non-transitory machine-readable mediums encoding instructions that when executed by one or more processors cause a process to be carried out for device tracking through use of a distributed ledger. The process includes receiving, by a device tracking system, an input from a user to register a device for tracking, the input comprising registration data specifying the device and one or more components in the device to register for tracking and a minimum acceptance criterion for each of the one or more components, the minimum acceptance criterion for a registered component defines a minimum threshold percentage of votes needed to approve a modification to the registered component. The process also includes recording the device identifier and the registration data related to the device in a device ledger, the device ledger comprising a device ledger data structure and a corresponding device rule execution set data structure. The process also includes generating a rule execution set for the device ledger, the rule execution set comprising one or more rules pertaining to approval of requests to modify the device, and processing requests to modify the device or the one or more registered components in the device based on the specified minimum acceptance criterion and the rule execution set.

In some embodiments, the process further includes generating a software defined lock for a component of the one or more components in the device, the software defined lock configured to prevent modification of the component.

In some embodiments, the registration data specifies one or more voting weights, and wherein processing requests to modify the device or the one or more registered components in the device is based on the specified one or more voting weights.

In some embodiments, the rule execution set indicates one of whether an approve by submitting device specific information voting feature is enabled, whether an approve by using provided link voting feature is enabled, and whether an approve by providing a one-time password (OTP) voting feature is enabled.

In some embodiments, the process further includes receiving, by the device tracking system, a request to remove a registered component from the device and receiving one or more votes either approving or disapproving the request to remove a registered component from the device. The process also includes, in response to a determination to approve the request, updating the device ledger to reflect the approval of the request to remove a registered component from the device and sending a signal to the device to release a software defined lock that was generated for the registered component.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the following description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Figure 1:
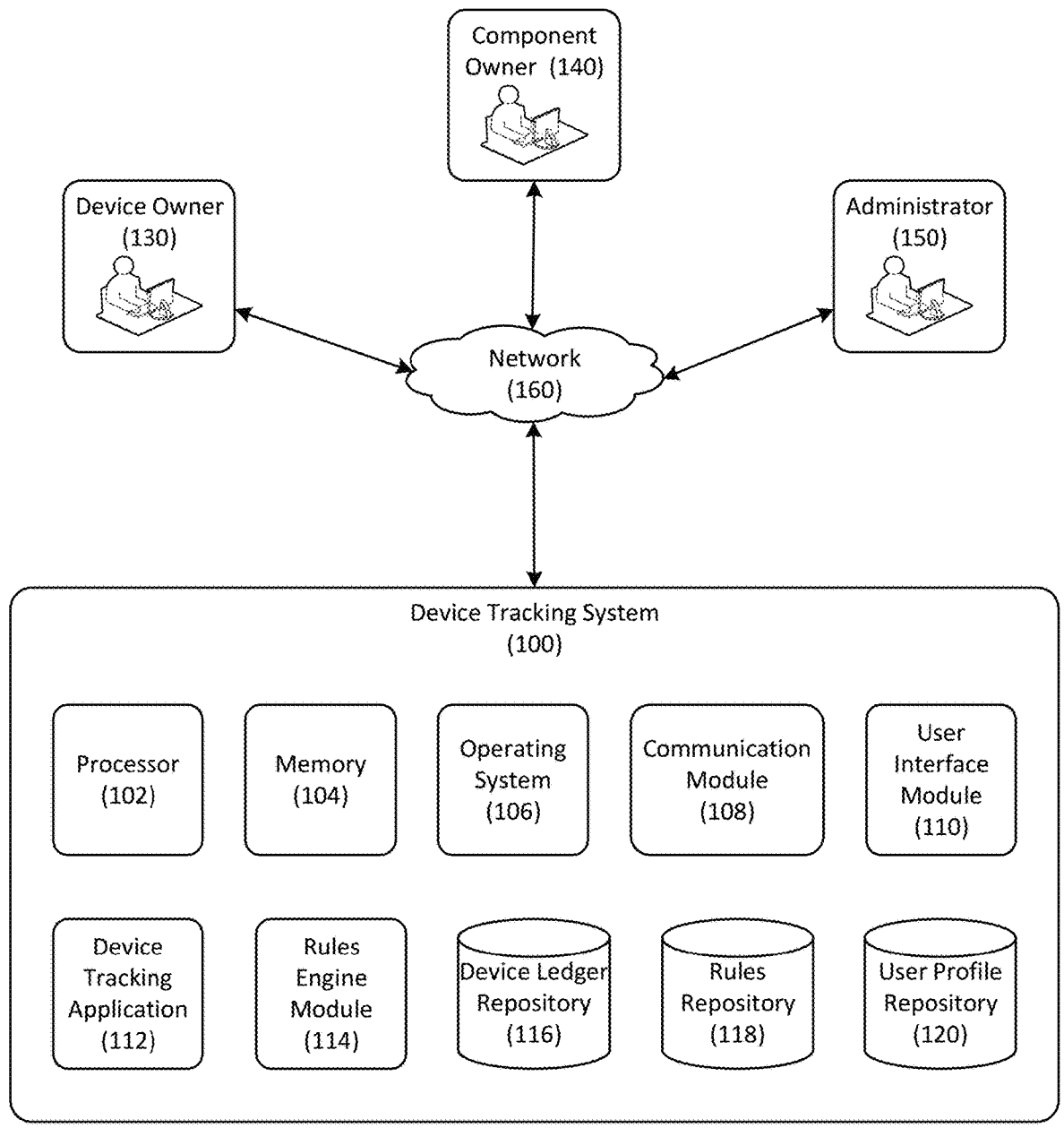
FIG. 1 is a block diagram schematically illustrating selected components of an example networked computer system that can be used to track electronic devices, in accordance with an embodiment of the present disclosure.

FIG. 1 is a block diagram schematically illustrating selected components of an example networked computer system that can be used to track electronic devices, in accordance with an embodiment of the present disclosure. More specifically, the system illustrated in FIG. 1 can be understood as enabling registered users (e.g., a device owner 130, a component owner 140, an administrator 150, among others) to leverage the services of a device tracking system 100. For instance, device owner 130 can register one or more devices, including one or more components in the individual devices, with device tracking system 100 for secure tracking of the registered devices and components. Once a device is registered with device tracking system 100 for tracking, owners of the registered components in the device (e.g., component owners 140) may similarly leverage the services of device tracking system 100 to securely track the individual registered components. In some cases, administrator 150 can register one or more devices, including one or more components in the individual devices, with device tracking system 100. By way of example, administrator 150 may be a person or entity who is responsible for the upkeep and reliable operation of a laboratory (e.g., a laboratory of an organization, such as a company, enterprise, government, or agency), and can register the devices, including selected components in the devices, in the laboratory with device tracking system 100 for secure tracking.

In such embodiments, device owner 130, component owner 140, and administrator 150 can communicate with device tracking system 100 via a network 160. Network 160 can also be used to access supplementary services and resources, some of which may (or may not) be integrated into and provided by device tracking system 100 in some cases. Thus, other embodiments may have fewer or more networks, services, and/or resources depending on the granularity of implementation. It will therefore be appreciated that the embodiments disclosed herein are not intended to be limited to the provision or exclusion of any particular services and/or resources.

Note that the number of users (e.g., device owner 130, component owner 140, and administrator 150) depicted in FIG. 1 is for illustration, and those skilled in the art will appreciate that there may be a different number of users, including a large number of users, who may register with and leverage the services of device tracking system 100. Also, for simplicity and ease of illustration, various embodiments and examples are provided herein in the context of registering and tracking a single device. However, those skilled in the art will appreciate that a large number, including very large numbers, of devices and components in the devices can be registered with device tracking system 100 for secure tracking.

Still referring to FIG. 1, network 160 may be a local area network (such as a home-based or office network), a wide area network (such as the Internet), a peer-to-peer network (such as a Bluetooth connection), or a combination of such networks, whether public, private, or both. In certain embodiments, at least a portion of the functionality associated with network 160 is provided by a cellular data network, thereby making it easier for users of mobile computing devices to leverage the services of device tracking system 100. In general, communications amongst the various entities and resources described herein may occur via wired or wireless connections, such as may be provided by Wi-Fi or mobile data networks.

As illustrated in FIG. 1, device owner 130, component owner 140, and administrator 150 each have access to a device that facilitates interaction with other users and/or components of device tracking system 100 illustrated in FIG. 1 or are otherwise described herein. For example, in certain embodiments, device owner 130, component owner 140, and administrator 150 each have access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The devices used by device owner 130, component owner 140, and administrator 150 optionally include a wired and/or wireless communication adapter that enables communication via network 160. The devices also optionally include input/output components such as one or more of a tactile keyboard, a display, a touch sensitive display, a microphone, a camera, and location services. Such input/output components allow device owner 130, component owner 1140, and administrator 150 to not only control operation of their own respective devices, but also to control certain operational aspects of device tracking system 100.

Still referring to the illustrative embodiment in FIG. 1, device tracking system 100 is programmed or otherwise configured to (e.g., includes an application or applications that are configured to) facilitate the secure tracking of devices, including one or more components in the individual devices. In some such embodiments, device tracking system 100 is also programmed or otherwise configured to generate a software defined lock for individual components that are registered for tracking to prevent modification of the individual components (e.g., prevent removal of a tracked component from a device that contains the component). In some embodiments, device tracking system 100 is also programmed or otherwise configured to secure a rule execution set generated for the individual registered devices from external threats (e.g., unauthorized modification or change to the rule execution set). In an example implementation, device tracking system 100 may provide such security by allowing modification of a rule execution set generated for a registered device by consensus of the owners of the device and the components of the device that are registered to be tracked and an administrator of device tracking system 100. To this end, in one embodiment, device tracking system 100 includes one or more software modules configured to implement certain of the functionalities disclosed herein, and optionally further includes hardware configured to enable such implementation. This hardware and/or software may include, but is not limited to, a processor 102, a memory 104, an operating system 106, a communication module 108, and a user interface module 110.

Processor 102 may be designed to control the operations of the various other components of device tracking system 100. Processor 102 may include any processing unit suitable for use in device tracking system 100, such as a single core or multi-core processor. In general, processor 102 may include any suitable special-purpose or general-purpose computer, computing entity, or computing or processing device including various computer hardware, or firmware, and may be configured to execute instructions, such as program instructions, stored on any applicable computer-readable storage media. For example, processor 102 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 1, processor 102 may include any number of processors and/or processor cores configured to, individually or collectively, perform or direct performance of any number of operations described in the present disclosure.

Memory 104 may include computer-readable storage media configured for carrying or having computer-executable instructions or data structures stored thereon. Such computer-readable storage media may include any available media that may be accessed by a general-purpose or special-purpose computer, such as processor 102. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Operating system 106 may comprise any suitable operating system, such as UNIX®, LINUX®, MICROSOFT® WINDOWS® (Microsoft Crop., Redmond, WA), GOOGLE® ANDROID™ (Google Inc., Mountain View, CA), APPLE® iOS (Apple Inc., Cupertino, CA), or APPLE® OS X® (Apple Inc., Cupertino, CA). As will be appreciated in light of this disclosure, the techniques provided herein can be implemented without regard to the particular operating system provided in conjunction with device tracking system 100, and therefore may also be implemented using any suitable existing or subsequently developed platform.

Communication module 108 can be any appropriate network chip or chipset which allows for wired or wireless communication via a network or networks, such as network 260 for instance, to one or more of the other components described herein. Communication module 108 can also be configured to provide intra-device communications via a bus or an interconnect.

User interface module 110 is configured to provide a user interface (or interfaces) that is capable of displaying information to, and receiving information from, a user of device tracking system 100. In an example implementation, user interface module 110 provides a device registration interface that is capable of receiving input that defines a registration of a device for tracking by device tracking system 100. The device registration interface is also capable of receiving input that defines a rule execution set (e.g., one or more rules that define criteria for allowing modification of the registered device) for a registered device. User interface module 110 is further configured to provide a notification interface that is capable of providing notifications of requests to modify (e.g., move, remove, update, dismantle, etc.) registered devices and/or registered components of registered devices. The notification interface is also capable of receiving responses to the requests to modify registered devices and/or registered components of registered devices. By way of example, the notification interface may be capable of receiving user input in the form of a vote to either approve or disapprove a request to modify a registered device. Still other interfaces can be implemented in other embodiments, including interfaces configured to facilitate registration of users (e.g., create user accounts) to utilize device tracking system 100 and interfaces configured to facilitate access to data maintained by device tracking system 100, including application programming interfaces (APIs), for example.

The various user interfaces provided or otherwise generated by user interface module 110 can be rendered using hardware components associated with an end user's computing device. Thus, for example, device owner 130 can use input/output components associated with his/her computing device to leverage services provided by user interface module 110 and, in particular, to display and interact with the user interfaces generated by user interface module 110. Examples of input/output components that can be used in this regard include a display, a keyboard, a pointing device, and a touch sensitive surface. Such components can be peripheral to an end user's computing device or can be integrated into such device. In certain embodiments, device tracking system 100 is implemented in a client-server arrangement wherein at least some functionality provided by one or more components may be provided to users (e.g., device owner 130, component owner 140, administrator 150, among others) using an applet (for example, a JavaScript applet) or other downloadable module. Such a remotely provisioned module can be provided in real-time in response to a request from the user for access to functionality associated with a particular user interface.

Referring still to the illustrative embodiment in FIG. 1, device tracking system 100 further includes a device tracking application 112, a rules engine module 114, a device ledger repository 116, a rules repository 118, and a user profile repository 120. Device tracking application 112 is generally configured to provide the overall control of registration of devices to facilitate the tracking of the registered devices by device tracking system 100. To this end, device tracking application 112 may receive input from a user to register a device for tracking by device tracking system 100. Device tracking application 112 may receive such input via an interface provided by user interface module 110. In an example implementation, such input to register a device may include registration data specifying, for example, a device that is to be registered for tracking, an owner of the device, one or more components in the device that is to be registered for tracking, and for individual specified components, an owner of the component and a minimum acceptance criterion for approving a modification to the component (e.g., a modification to the device that involves the component), and a request priority for the device. The specified owner is a person or entity that owns or is responsible for the specified device or the specified individual component in the device. For example, within a company, although the owner a device is the company, the specified owner may an employee of the company who is responsible for the device (i.e., an employee to whom the device or the individual component in the device is assigned). The specified minimum acceptance criterion defines a threshold percentage of votes needed to approve a modification to the corresponding component in the device. The specified request priority defines a priority that is to be applied to requests to modify the specified device relative to other devices that are being tracked by device tracking system 100. In some implementations, the registration data may also include data specifying voting weights to be assigned to votes (e.g., "yes" or "no"; "approve" or "disapprove") submitted in response to requests to modify the registered device.

In some embodiments, a user registering a device for tracking may input data specifying rules pertaining or otherwise relating to a registered device. More specifically, one or more of the rules may pertain or relate to approving requests to modify the registered device. In an example implementation, such input may specify, for example, number of devices, number of device/component owners, a minimum number of users that should provide approval, and a frequency. The specified number of devices indicates a total number of devices (i.e., the device and the specified components in the device that are being registered) that are being registered by the registration of the device. The specified number of device/component owners indicates the total number of owners (i.e., a count of the owner of the device that is being registered and the owner of the individual components that is being registered in of the device) related to the registration of the device. Note that the device and one or more components or multiple components may be owned by a common owner. Note also that an owner may not be specified for the device or for one or more components in the device. Thus, the specified number of devices and the specified number of device/component owners may be the same or different. The specified minimum number of users that should provide approval indicates the minimum number of users that need to provide approval for any requested modification to the device. In other words, the specified minimum number of users that should provide approval indicates the minimum number of approval votes needed to approve any requested modification to the device. The specified frequency indicates a frequency with which device tracking system 100 is to generate or otherwise provide to an owner (e.g., an owner of a registered device and owner(s) of specified component(s) in the device) a notification to track their device and/or components.

In some embodiments, a user registering a device for tracking may enable a proxy voting feature provided by device tracking system 100. The proxy voting feature allows an administrator (e.g., administrator 150) to vote as a proxy in cases where an owner is not specified for a registered device or a specified component in the registered device. When proxy voting is enabled, a notification of a request to modify a registered device that is not currently associated with a device owner (e.g., a device owner is not specified for the registered device) is sent or otherwise provided to the administrator and the administrator can submit a vote as a proxy to either approve or disapprove the request. Similarly, a notification of a request to modify a registered component that is not currently associated with a component owner (e.g., a component owner is not specified for the registered component) is sent or otherwise provided to the administrator and the administrator can submit a vote as a proxy to either approve or disapprove the request.

In some embodiments, a user registering a device for tracking may enable one or more secure voting features for submitting a vote approving a request to modify a registered device is to be submitted. Such security modes may include, for example, approve by submitting device specific information, approve by using provided link, and approve by providing a one-time password (OTP). For example, if approve by submitting device specific information security mode feature is enabled, a vote approving a request is validated as an approval vote if the device specific information submitted with the vote is accurate. As another example, if approve by using provided link security mode feature is enabled, a notification of a request to modify a registered device includes a link for use in submitting a vote approving the request. In this example case, a vote approving the request is validated as an approval vote if the vote is submitted using the provided link. As yet another example, if approve by providing an OTP security mode feature is enabled, a notification of a request to modify a registered device includes an OTP. In this example case, a vote approving the request is validated as an approval vote if the OTP included in the notification is provided or otherwise submitted with the vote.

In some embodiments, device tracking application 112 may utilize device ledger data structures and corresponding device rule execution set data structures to maintain and track registered devices. A device ledger data structure and a corresponding device rule execution set data structure includes information related to an individual registered device and may serve or otherwise function as a device ledger for the individual registered device. For example, an illustrative device ledger data structure 200 is shown in FIG. 2 and an illustrative device rule execution set data structure 300 is shown in FIG. 3.

Figure 2:
FIG. 2 is a diagram showing an illustrative device ledger data structure, in accordance with an embodiment of the present disclosure.
Figure 3:
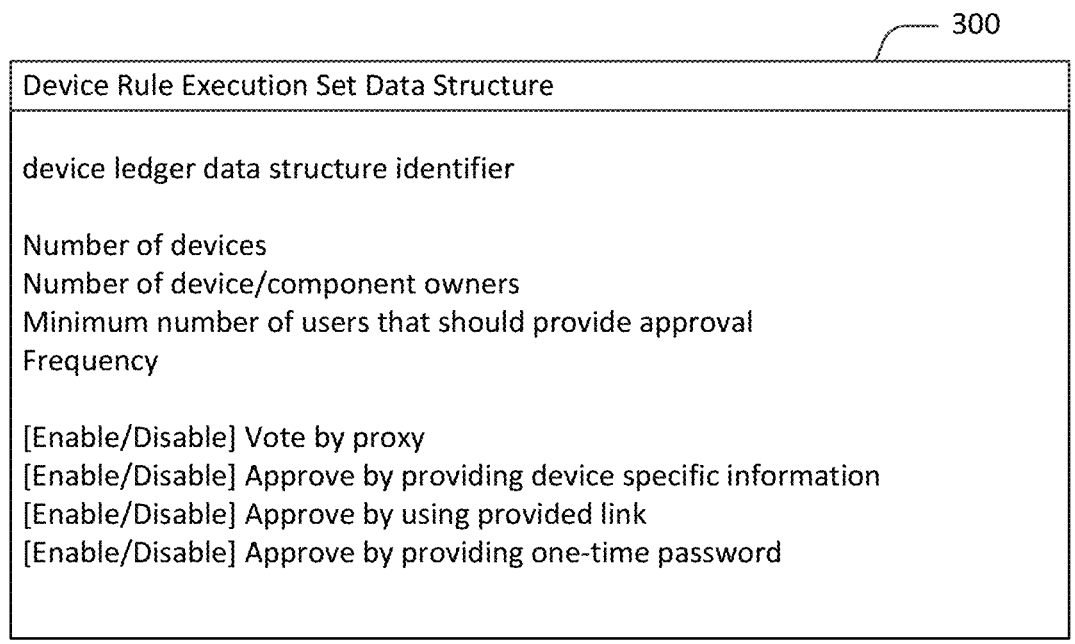
FIG. 3 is a diagram showing an illustrative device rule execution set data structure, in accordance with an embodiment of the present disclosure.

As shown in FIG. 2, device ledger data structure 200 includes a "requestPriority" which indicates a priority that is to be applied to requests to modify the device that is being tracked using device ledger data structure 200 relative to other devices that are being tracked by device tracking system 100. The "requestPriority" includes a "deviceID", which further includes an "active user ID". The "deviceID" is an identifier that uniquely identifies a device that is being tracked using the specific device ledger data structure (e.g., device ledger data structure 200). In an example implementation, the "deviceID" may be a media access control (MAC) address assigned to or otherwise associated with the device. The "active user ID" is an identifier of the owner of the device specified when registering the device. In an example implementation, the "active user ID" may be a public key of or otherwise associated with the indicated owner of the device (i.e., the owner identified by the "active user ID"). In the case where an owner is not specified for the device (e.g., an owner was not specified when registering the device), an administrator of device tracking system 100 may be indicated as the owner of the device and, in such case, the "active user ID" may be a public key of or otherwise associated with the administrator.

Still referring to device ledger data structure 200, the "requestPriority" also includes a "components". The "components" lists the specific components in the device that are being registered for tracking using the specific device ledger data structure (e.g., device ledger data structure 200). In the example shown in FIG. 2, the "components" lists three components "componentID1", "componentID2", and "componentID3". The "componentID1" is an identifier that uniquely identifies a first component in the device, the "componentID2" is an identifier that uniquely identifies a second component in the device, and the "componentID3" is an identifier that uniquely identifies a third component in the device. The individual specified components further include an "active user ID" and a "MinAcceptanceCriterion". The "active user ID" is an identifier of the owner of the component and the "MinAcceptanceCriterion" is a minimum acceptance criterion that defines a threshold percentage of votes needed to approve a modification to the corresponding component. In the example shown in FIG. 2, the threshold percentage of votes needed to approve a modification to the first component (i.e., the component identified by "componentID1") is 70% ("MinAcceptanceCriterion":70), the threshold percentage of votes needed to approve a modification to the second component (i.e., the component identified by "componentID2") is 45% ("MinAcceptanceCriterion":45), and the threshold percentage of votes needed to approve a modification to the third component (i.e., the component identified by "componentID3") is 80% ("MinAcceptanceCriterion":80). In an example implementation, the "active user ID" may be a public key of or otherwise associated with the indicated owner of the component (i.e., the owner identified by the "active user ID"). In the case where an owner is not specified for a specified component (e.g., an owner was not specified for the component when registering the device), an administrator of device tracking system 100 may be indicated as the owner of the component and, in such case, the "active user ID" for the component may be a public key of or otherwise associated with the administrator. The number of components listed in device ledger data structure 200 (e.g., "componentID1", "componentID2", and "componentID3") is for illustration, and those skilled in the art will appreciate that device ledger data structure 200 may list a different number (e.g., one, two, four, etc.) of components of the device.

In cases where voting weights are specified for one or more of the owners who are indicated in a device ledger data structure (e.g., the one or more owners associated with a device that is being tracked using the device ledger data structure), the specified voting weights may be maintained in the device ledger data structure. In the example shown in FIG. 2, "userDeviceOrCompContribution" lists the voting weights that have been specified for the administrator (identified by "uuin_admin"), the device owner (identified by "uuin_owner"), and the individual component owners (identified by "uuincompowner"). As shown, the voting weight specified for the administrator is 40% ("uuin_admin":40), the voting weight specified for the device owner is 40% ("uuin_owner":40), and the voting weight specified for the individual component owners is 20% ("uuincompowner": 20). In some embodiments, device tracking application 112 may allow different voting weights to be specified for the individual component owners (e.g., a voting weight of 15% specified for the owner of the first component, a voting weight of 20% specified for the owner of the second component, and a voting weight of 25% specified for the owner of the third component). In cases where voting weights are not specified, device tracking system 100 may assign the individual votes the same weight or a default weight.

In some embodiments, sensitive data in device ledger data structure 200 (e.g., identifiers of the owners, identifiers of the device and components, threshold values, values for the voting weights, etc.) may be in encrypted form. For example, in an example implementation, such sensitive data in device ledger data structure 200 may be encrypted using a private key corresponding to the public key (e.g., the device ledger data structure identifier) that identifies device ledger data structure 200. Encrypting the sensitive data using the private key corresponding to the public key being used to identify device ledger data structure 200 allows the encrypted data to be decrypted using the public key included in device ledger data structure 200.

Still referring to FIG. 2, device ledger data structure 200 also includes a device ledger data structure identifier. The device ledger data structure identifier uniquely identifies device ledger data structure 200 (i.e., uniquely identifies a device ledger data structure) generated for use in tracking a specific registered device. In an example implementation, the device ledger data structure identifier may be a public key generated using a hash value created by applying a hashing algorithm to the user identifier (e.g., a public key) of the indicated device owner (i.e., the user identified by "active user ID" associated with "deviceID") and a unique identifier (e.g., MAC address) of the device. As explained above, in cases where an owner is not specified for the device, an administrator of device tracking system 100 may be indicated as the owner of the device. In such cases, the device ledger data structure identifier may be a public key generated using a hash value created by applying a hashing algorithm to the identifier (e.g., a public key) of the administrator and a unique identifier (e.g., MAC address) of the device.

Referring now to FIG. 3, device rule execution set data structure 300 includes a device ledger data structure identifier that identifies a corresponding device ledger data structure (e.g., device ledger data structure 200) to which the rules and other information contained in device rule execution set data structure 300 applies. As shown, device rule execution set data structure 300 may also include values for number of devices, number of device/component owners, a minimum number of users that should provide approval, and a frequency. The value for number of devices indicates a total number of devices (i.e., the device and the components in the device) that are identified in the corresponding device ledger data structure. The indicated value is the total number of devices that are being registered by the registration of the device. The value for number of device/component owners indicates the total number of owners that are identified in the corresponding device ledger data structure (i.e., a count of the owners identified in the corresponding device ledger data structure). The value for minimum number of users that should provide approval indicates the minimum number of users that need to provide approval for any requested modification to the device. Note that the users who are requested to vote to either approve or disapprove a request to modify a device and/or a component in the device that is being tracked using the corresponding device ledger data structure are the owners who are identified in the corresponding device ledger data structure. The value for frequency indicates a frequency with which device tracking system 100 is to generate or otherwise provide to an owner (e.g., device owner and component owners identified in the corresponding device ledger data structure) a notification to track their device and/or components.

Device rule execution set data structure 300 may also include data values indicating whether certain secure voting features provided by device tracking system 100 are enabled or disabled. For example, as shown in FIG. 3, device rule execution set data structure 300 may include a data value that indicates whether the proxy voting feature is enabled ([Enable/Disable] Vote by proxy), a data value that indicates whether the approve by submitting device specific information voting feature is enabled ([Enable/Disable] Approve by providing device specific information), a data value that indicates whether the approve by using provided link voting feature is enabled ([Enable/Disable] Approve by using provided link), and a data value that indicates whether the approve by providing an OTP voting feature is enabled ([Enable/Disable] Approve by providing one-time password).

Referring again to FIG. 1, rules engine module 114 is generally configured to determine, according to the information in the relevant device ledger data structure and corresponding device rule execution set data structure that are being used to track a device, whether a request to modify the device and/or a component in the device is to be approved or disapproved. To this end, upon receiving a request to modify the device and/or a component in the device, rules engine module 114 may identify the device ledger data structure and corresponding device rule execution set data structure (i.e., a device ledger) that are being used to track the device. Rules engine module 114 may then send or otherwise provide to the owners indicated in the identified device ledger data structure (i.e., the owners identified by the one or more "active user IDs") a notification of the received request. The provided notification may include a request to submit a vote to either approve or disapprove the received request. As such, the users who vote to approve a request to modify a device and/or a component in the device that is being tracked using a device ledger data structure are the owners that are identified in the device ledger data structure. Rules engine module 114 may then process the submitted votes according to the relevant information in the identified device ledger data structure (e.g., indicated request priority, indicated threshold percentage of votes needed to approve a modification to a component, indicated voting weights, etc.) and corresponding device rule execution set data structure (e.g., indicated minimum number of users that need to provide approval, the enabled secure voting features, etc.) to either approve or disapprove the request.

Device ledger repository 116 may be a repository for the device ledger data structures (e.g., device ledger data structures 200) being utilized by device tracking system 100 to track the registered devices. Device ledger repository 116 may be implemented using any computer-readable storage media suitable for carrying or having data or data structures stored thereon.

Rules repository 118 may be a repository for the device rule execution set data structures (e.g., device rule execution set data structures 300) being utilized by device tracking system 100 to track the registered devices. Rules repository 118 may be implemented using any computer-readable storage media suitable for carrying or having data or data structures stored thereon.

User profiles repository 120 may be a repository for the user profile data structures generated for the users registered with device tracking system 100. As explained herein, users may register with device tracking system 100 to leverage the services, including registering and tracking of devices, provided by device tracking system 100. A user profile data structure generated for a registered user includes data associated with the registered user. For example, an illustrative user profile data structure 400 is shown in FIG. 4.

Figure 4:
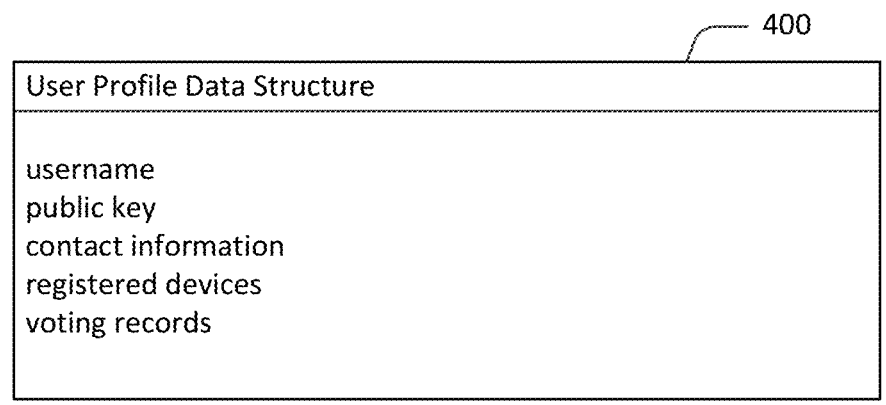
FIG. 4 is a diagram showing an illustrative user profile data structure, in accordance with an embodiment of the present disclosure.

As shown in FIG. 4, user profile data structure 400 includes a username, a public key, contact information, registered devices, and voting records. The username is a username associated with a user associated with user profile data structure 400 (i.e., the registered user whose information is being maintained in user profile data structure 400). The public key is a public key of or otherwise associated with the user associated with user profile data structure 400. For example, the user may provide his/her public key when registering with device tracking system 100. The contact information includes information relating to how the user may be contacted (e.g., email address, telephone number, etc.). For example, rules engine module 114 may send notifications (e.g., notification of a request to modify a device and/or a component in the device) to a user using the contact information in the user's user profile data structure 400. The registered devices indicate the devices that are registered for tracking with device tracking system 100 and which are associated with the user. These devices may be devices owned by the user or devices which include a component or components owned by the user. The voting records is a record of the user's voting history (i.e., a record of the votes submitted by the user).

In some embodiments, device tracking system 100 may utilize software defined locks to further control modification to registered devices. As an example, when a device and one or more components of the device are registered for tracking, device tracking system 100 may generate a software defined lock for the individual one or more components. A software defined lock generated for a component is configured to prevent modification (e.g., removal) of the component. Then, upon determining that a request to modify a component is approved, the system can release the software defined lock generated for the component. For example, device tracking system 100 can send a signal to open the software defined lock, thus allowing the requested modification to the component.

Figure 5:
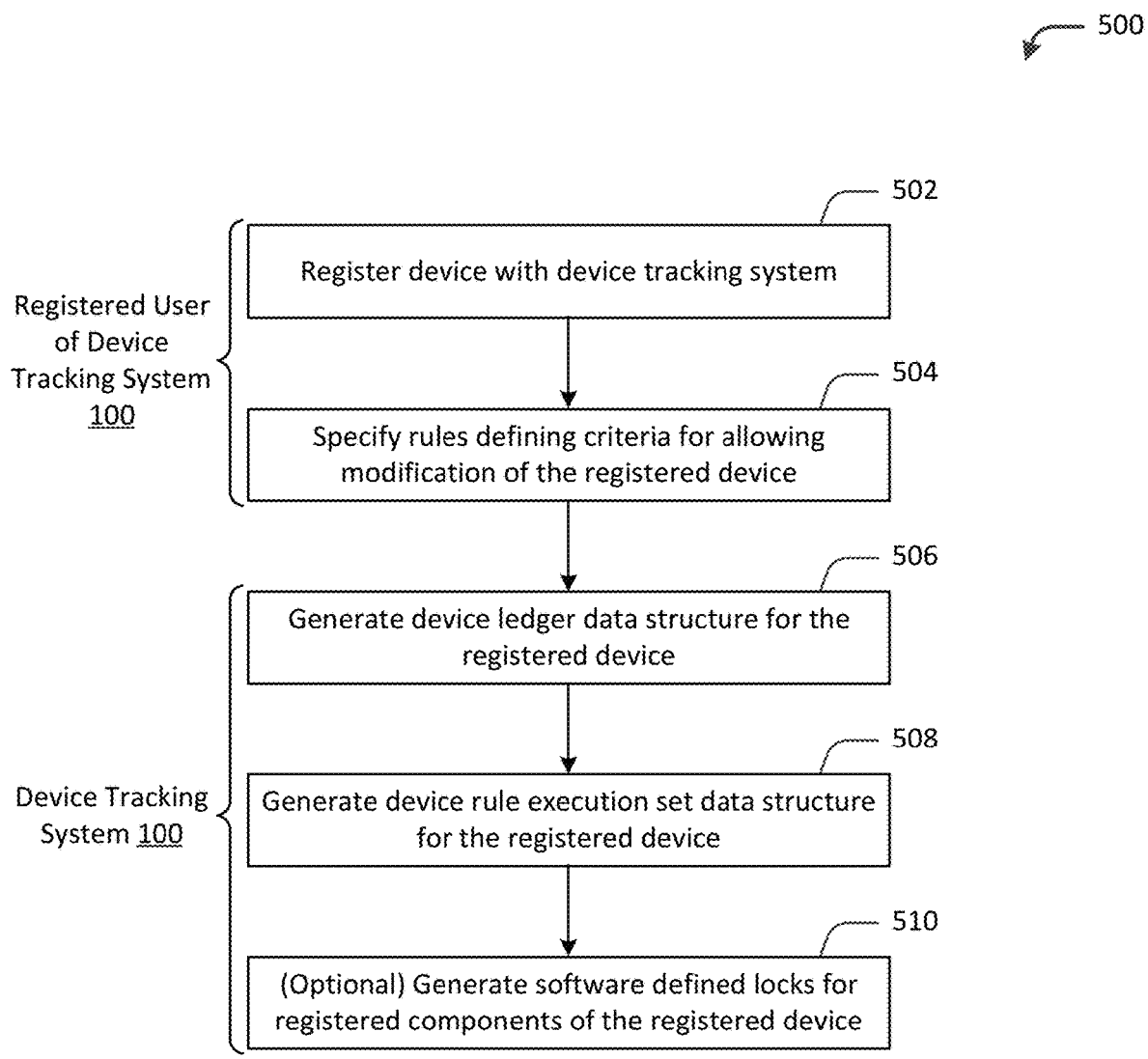
FIG. 5 is a flow diagram of an illustrative process for registering a device with a device tracking system, in accordance with an embodiment of the present disclosure.

FIG. 5 is a flow diagram of an illustrative process 500 for registering a device with device tracking system 100, in accordance with an embodiment of the present disclosure. Process 500, and illustrative process 600 further described below, may be implemented or performed by any suitable hardware, or combination of hardware and software, including without limitation the system shown and described with respect to FIG. 1, the computer system shown and described with respect to FIG. 7, or a combination thereof. For example, in some embodiments, the operations, functions, or actions illustrated in process 500, and illustrative process 600 further described below, may be performed, for example, in whole or in part by any combination of components of a computer system 70 described with respect to FIG. 7 below and/or device tracking application 112, rules engine module 114, or any combination of these including other components of system 100 described with respect to FIG. 1.

With reference to process 500 of FIG. 5, and in an illustrative scenario, an administrator of a computing lab may want to register a device (e.g., System A) brought into the lab, and four components in the device (e.g., Comp H, Comp I, Comp J, and Comp K), for tracking by device tracking system 100. To register the device and the four components, the lab administrator may log in to device tracking system 100 as a registered user. At 502, the lab administrator may utilize device tracking application 112 to register System A, and Comp H, Comp I, Comp J, and Comp K in System A, for tracking by device tracking system 100. In registering System A, the lab administrator may specify that User A is the owner of System A, User H is the owner of Comp H, User I is the owner of Comp I, User J is the owner of Comp J, and User K is the owner of Comp K. The lab administrator may also specify that the minimum acceptance criterion for approving a modification to Comp H is 60%, the minimum acceptance criterion for approving a modification to Comp I is 60%, the minimum acceptance criterion for approving a modification to Comp J is 70%, and the minimum acceptance criterion for approving a modification to Comp K is 80%. The lab administrator may further specify the following voting weights for User A, User H, User I, User J, and User K: 40% for the lab administrator; 40% for User A; 15% for User H; 15% for User I; 15% for User J; and 15% for User K. Note that User A, User H, User I, User J, and User K are registered users of device tracking system 100.

At 504, the lab administrator may specify the rules for allowing modification of the device (e.g., System A). Continuing the above example, the lab administrator may specify that at least four users need to provide approval for any requested modification to System A.

At 506, device tracking application 112 may generate a device ledger data structure (e.g., device ledger data structure 200) to maintain the registration information related to the registration of the device (e.g., registration information related to registration of System A and Comp H, Comp I, Comp J, and Comp K in System A). At 508, device tracking application 112 may generate a corresponding device rule execution set data structure (e.g., device rule execution set data structure 300) to maintain the rules information related to the registration of the device (e.g., rules information related to registration of System A and Comp H, Comp I, Comp J, and Comp K in System A). Device tracking system 100 may then utilize the device ledger data structure and the corresponding device rule execution set data structure to track System A and Comp H, Comp I, Comp J, and Comp K in System A.

At 510, device tracking system 100 may optionally generate a software defined lock for the individual registered components of the device to prevent modification (e.g., removal) of the individual registered components. Continuing the above example, device tracking system 100 may generate a software defined lock for Comp H, a software defined lock for Comp I, a software defined lock for Comp J, and a software defined lock for Comp K.

Figure 6:
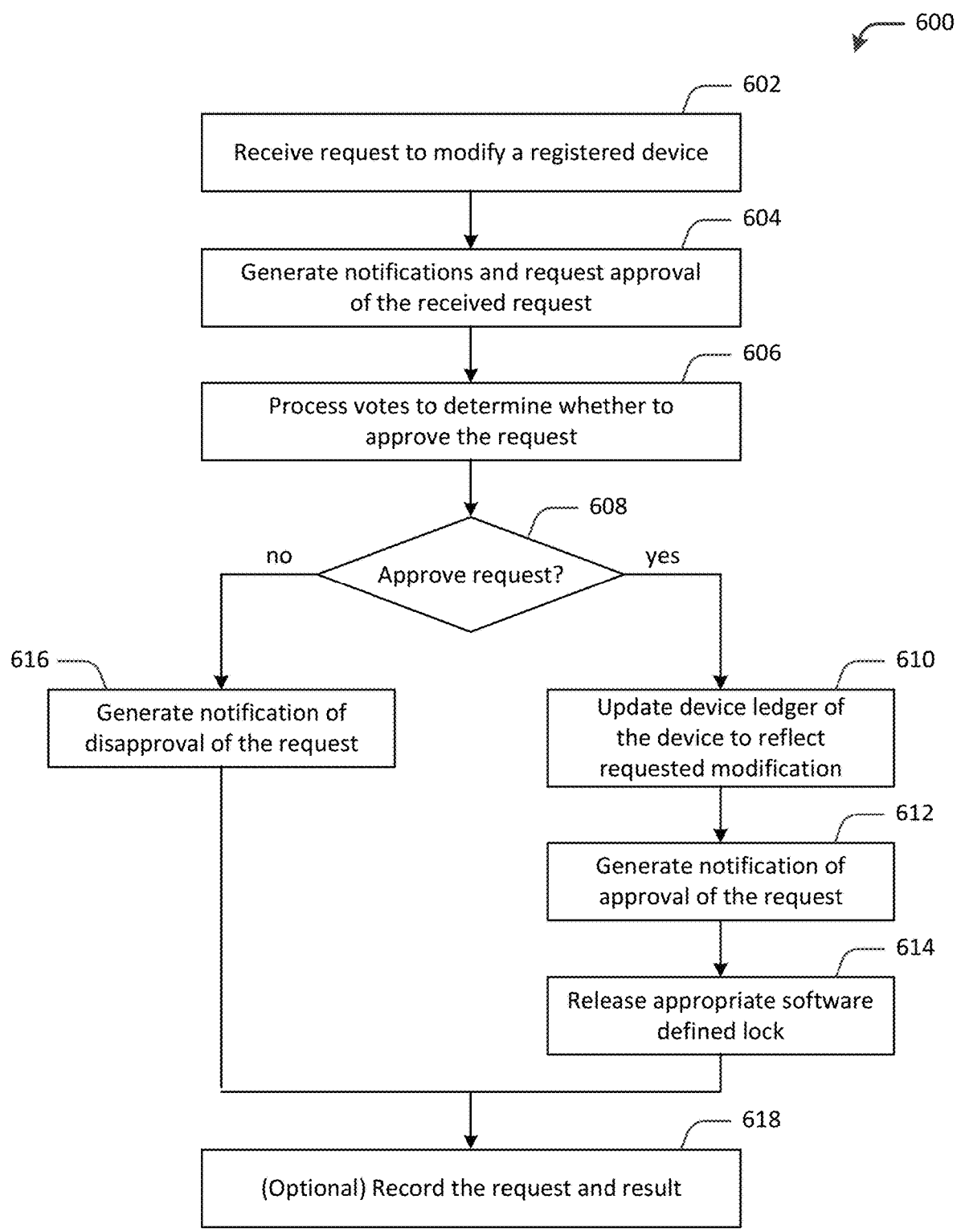
FIG. 6 is a flow diagram of an illustrative process for processing a request to modify a device registered with a device tracking system, in accordance with an embodiment of the present disclosure.

FIG. 6 is a flow diagram of an illustrative process 600 for processing a request to modify a device registered with device tracking system 100, in accordance with an embodiment of the present disclosure. At 602, device tracking system 100 may receive a request to modify a device that is registered with device tracking system 100 for tracking by device tracking system 100. Continuing the above example, a user (e.g., User X) may log in to device tracking system 100 and input data requesting to remove Comp H from System A.

Upon receiving the request, at 604, rules engine module 114 of device tracking system 100 may generate a notification informing of the received request. Rules engine module 114 may then send or otherwise provide to the users who need to be notified of the request (e.g., the indicated owners of the device and components in the device) the generated notification. The notification may include a request to submit a vote to either approve or disapprove the request. Continuing the above example, rules engine module 114 may generate a notification informing of the request by User X to remove Comp H from System A and send or otherwise provide the notification to User A, User H, User I, User J, and User K. In certain implementations, rules engine module 114 may also send or otherwise provide the notification to the lab administrator. However, in the above example, the notification provided to the lab administrator may not include a request to submit a vote since the lab administrator is not indicated as being an owner of System A, Comp H, Comp I, Comp J, or Comp K. The provided notification may be in the form of an email, a text message, or other suitable communication means.

At 606, rules engine module 114 may process the submitted votes to determine whether to approve the request based on the information in the device ledger (e.g., the device ledger data structure and the corresponding device rule execution set data structure) generated to track the device. Continuing the above example, rules engine module 114 may process the submitted votes to determine whether to approve the request to remove Comp H from System A based on the minimum acceptance criterion for approving a modification to Comp H and the voting weights indicated in the device ledger data structure, and the minimum number of users needed to provide approval for any modification to System A indicated in the corresponding device rule execution set data structure.

At 608, rules engine module 114 may determine whether to approve or disapprove the request to modify the device. Continuing the above example, suppose User A, User H, User I, and User J submit votes to approve the request to remove Comp H from System A, and User K submits a vote to disapprove the request to remove Comp H from System A. In this case, rules engine module 114 may determine to approve the request since the indicated 60% minimum acceptance criterion threshold for approving a modification to Comp H is satisfied (i.e., 40% voting weight for User A+15% voting weight for User H+15% voting weight for User I+15% voting weight for User J satisfies the 60% minimum acceptance criterion threshold) and the indicated minimum four users needing to provide approval for any requested modification to System A is satisfied (i.e., User A, User H, User I, and User J submitted approval votes). However, suppose User A, User H, and User I submit votes to approve the request to remove Comp H from System A, and User J and User K submits votes to disapprove the request to remove Comp H from System A. In this case, rules engine module 114 may determine to disapprove the request since the indicated minimum four users needing to provide approval for any requested modification to System A is not satisfied (i.e., only three users, User A, User H, and User I, submitted approval votes). Note that rules engine module 114 may determine to disapprove the request in this example case even though the indicated 60% minimum acceptance criterion threshold for approving a modification to Comp H is satisfied (i.e., 40% voting weight for User A+15% voting weight for User H+15% voting weight for User I satisfies the 60% minimum acceptance criterion threshold).

If a determination is made to approve the request to modify the device, then, at 610, rules engine module 114 may update the device ledger associated with the device to reflect the approval of the requested modification to the device. Continuing the above example, rules engine module 114 may update the information in the device ledger data structure that is being used to track System A to indicate that Comp H is no longer included in System A (i.e., indicate that Comp H is no longer a component of System A). Rules engine module 114 may also remove from the device ledger data structure that is being used to track System A information related to Comp H.

At 612, rules engine module 114 may generate a notification informing of the approval of the request to modify the device. Rules engine module 114 may then send or otherwise provide the generated notification to the users who need to be notified of the approval of the request. Continuing the above example, rules engine module 114 may generate a notification informing of the approval of the request by User X to remove Comp H from System A and send or otherwise provide the notification to User X, User A, User H, User I, User J, and User K. In certain implementations, rules engine module 114 may also send or otherwise provide the notification to the lab administrator.

Still continuing the above example, if a software defined lock was generated for Comp H, at 614, rules engine module 114 may send a signal to System A to release the software defined lock that was generated for Comp H. Releasing the software defined lock allows Comp H to be removed from System A.

Otherwise, if, at 608, a determination is made to disapprove the request to modify the device, then, at 616, rules engine module 114 may generate a notification informing of the disapproval of the request to modify the device. Rules engine module 114 may then send or otherwise provide the generated notification to the users who need to be notified of the disapproval of the request. Continuing the above example, rules engine module 114 may generate a notification informing of the disapproval of the request by User X to remove Comp H from System A and send or otherwise provide the notification to User X, User A, User H, User I, User J, and User K. In certain implementations, rules engine module 114 may also send or otherwise provide the notification to the lab administrator.

Upon processing the approval or the request or the disapproval of the request, at 618, rules engine module 114 may optionally record the request (i.e., the request to modify the device) and the result (i.e., either the approval of the request or disapproval of the request). Continuing the above example, rules engine module 114 may record in the respective user profile data structures for User A, User H, User I, User J, and User K an indication of the request by User X to remove Comp H from System A along with an indication of how the particular user voted. For example, rules engine module 114 may record in the user profile data structure for User A an indication of the request by User X to remove Comp H from System A and an indication of how User A voted. Similarly, rules engine module 114 may record in the user profile data structure for User H an indication of the request by User X to remove Comp H from System A and an indication of how User H voted, and so on.

Figure 7:
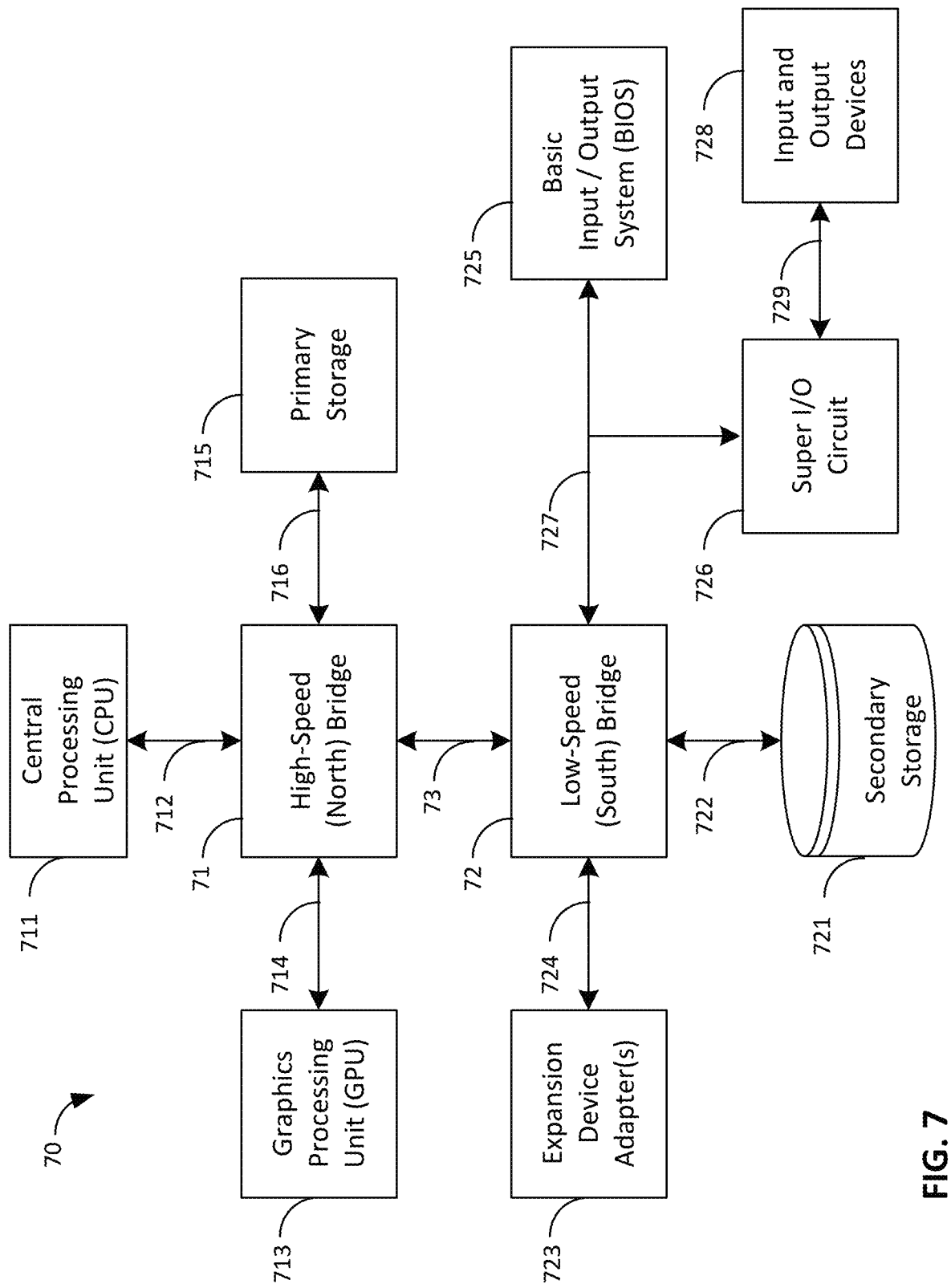
FIG. 7 schematically shows relevant physical components of a computer system that may be used in accordance with an embodiment of the concepts, structures, and techniques disclosed herein.

FIG. 7 schematically shows relevant physical components of a computer system 70 that may be used in accordance with an embodiment of the concepts, structures, and techniques disclosed herein. Generally, computer system 70 has many functional components that communicate data with each other using data buses. The functional components of FIG. 7 are physically arranged based on the speed at which each must operate, and the technology used to communicate data using buses at the necessary speeds to permit such operation.

Thus, computer system 70 is arranged as high-speed components and buses 711 to 716 and low-speed components and buses 721 to 729. High-speed components and buses 711 to 716 are coupled for data communication using a high-speed bridge 71, also called a "northbridge," while low-speed components and buses 721 to 729 are coupled using a low-speed bridge 72, also called a "southbridge."

Computer system 70 includes a central processing unit ("CPU") 711 coupled to high-speed bridge 71 via a bus 712. CPU 711 is electronic circuitry that carries out the instructions of a computer program. As is known in the art, CPU 711 may be implemented as a microprocessor; that is, as an integrated circuit ("IC"; also called a "chip" or "microchip"). In some embodiments, CPU 711 may be implemented as a microcontroller for embedded applications, or according to other embodiments known in the art.

Bus 712 may be implemented using any technology known in the art for interconnection of CPUs (or more particularly, of microprocessors). For example, bus 712 may be implemented using the HyperTransport architecture developed initially by AMD, the Intel QuickPath Interconnect ("QPI"), or a similar technology. In some embodiments, the functions of high-speed bridge 71 may be implemented in whole or in part by CPU 711, obviating the need for bus 712.

Computer system 70 includes one or more graphics processing units (GPUs) 713 coupled to high-speed bridge 71 via a graphics bus 714. Each GPU 713 is designed to process commands from CPU 711 into image data for display on a display screen (not shown). In some embodiments, CPU 711 performs graphics processing directly, obviating the need for a separate GPU 713 and graphics bus 714. In other embodiments, GPU 713 is physically embodied as an integrated circuit separate from CPU 711 and may be physically detachable from computer system 70 if embodied on an expansion card, such as a video card. GPU 713 may store image data (or other data, if GPU 713 is used as an auxiliary computing processor) in a graphics buffer.

Graphics bus 714 may be implemented using any technology known in the art for data communication between a CPU and a GPU. For example, graphics bus 714 may be implemented using the Peripheral Component Interconnect Express ("PCI Express" or "PCIe") standard, or a similar technology.

Computer system 70 includes a primary storage 715 coupled to high-speed bridge 71 via a memory bus 716. Primary storage 715, which may be called "main memory" or simply "memory" herein, includes computer program instructions, data, or both, for use by CPU 711. Primary storage 715 may include random-access memory ("RAM"). RAM is "volatile" if its data are lost when power is removed, and "non-volatile" if its data are retained without applied power. Typically, volatile RAM is used when computer system 70 is "awake" and executing a program, and when computer system 70 is temporarily "asleep", while non-volatile RAM ("NVRAM") is used when computer system 70 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

Memory bus 716 may be implemented using any technology known in the art for data communication between a CPU and a primary storage. Memory bus 716 may comprise an address bus for electrically indicating a storage address, and a data bus for transmitting program instructions and data to, and receiving them from, primary storage 715. For example, if data are stored and retrieved 64 bits (eight bytes) at a time, then the data bus has a width of 64 bits. Continuing this example, if the address bus has a width of 32 bits, then $2^{32}$ memory addresses are accessible, so computer system 70 may use up to $8*2^{32}=32$ gigabytes (GB) of primary storage 715. In this example, memory bus 716 will have a total width of 64+32=96 bits. Computer system 70 also may include a memory controller circuit (not shown) that converts electrical signals received from memory bus 716 to electrical signals expected by physical pins in primary storage 715, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide CPU 711, graphics processing units 713, primary storage 715, and high-speed bridge 71, or any combination thereof, as a single integrated circuit. In such embodiments, buses 712, 714, 716 may form part of the same integrated circuit and need not be physically separate. Other designs for computer system 70 may embody the functions of CPU 711, graphics processing units 713, and primary storage 715 in different configurations, obviating the need for one or more of buses 712, 714, 716.

The depiction of high-speed bridge 71 coupled to CPU 711, GPU 713, and primary storage 715 is merely exemplary, as other components may be coupled for communication with high-speed bridge 71. For example, a network interface controller ("NIC" or "network adapter") may be coupled to high-speed bridge 71, for transmitting and receiving data using a data channel. The NIC may store data to be transmitted to, and received from, the data channel in a network data buffer.

High-speed bridge 71 is coupled for data communication with low-speed bridge 72 using an internal data bus 73. Control circuitry (not shown) may be required for transmitting and receiving data at different speeds. Internal data bus 73 may be implemented using the Intel Direct Media Interface ("DMI") or a similar technology.

Computer system 70 includes a secondary storage 721 coupled to low-speed bridge 72 via a storage bus 722. Secondary storage 721, which may be called "auxiliary memory", "auxiliary storage", or "external memory" herein, stores program instructions and data for access at relatively low speeds and over relatively long durations. Since such durations may include removal of power from computer system 70, secondary storage 721 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

Storage bus 722 may be implemented using any technology known in the art for data communication between a CPU and a secondary storage and may include a host adaptor (not shown) for adapting electrical signals from low-speed bridge 72 to a format expected by physical pins on secondary storage 721, and vice versa. For example, storage bus 722 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

Computer system 70 also includes one or more expansion device adapters 723 coupled to low-speed bridge 72 via a respective one or more expansion buses 724. Each expansion device adapter 723 permits computer system 70 to communicate with expansion devices (not shown) that provide additional functionality. Such additional functionality may be provided on a separate, removable expansion card, for example an additional graphics card, network card, host adaptor, or specialized processing card.

Each expansion bus 724 may be implemented using any technology known in the art for data communication between a CPU and an expansion device adapter. For example, expansion bus 724 may transmit and receive electrical signals using a Peripheral Component Interconnect ("PCI") standard, a data networking standard such as an Ethernet standard, or a similar technology.

Computer system 70 includes a basic input/output system ("BIOS") 725 and a Super I/O circuit 726 coupled to low-speed bridge 72 via a bus 727. BIOS 725 is a non-volatile memory used to initialize the hardware of computer system 70 during the power-on process. Super I/O circuit 726 is an integrated circuit that combines input and output ("I/O") interfaces for low-speed input and output devices 728, such as a serial mouse and a keyboard. In some embodiments, BIOS functionality is incorporated in Super I/O circuit 726 directly, obviating the need for a separate BIOS 725.

Bus 727 may be implemented using any technology known in the art for data communication between a CPU, a BIOS (if present), and a Super I/O circuit. For example, bus 727 may be implemented using a Low Pin Count ("LPC") bus, an Industry Standard Architecture ("ISA") bus, or similar technology. Super I/O circuit 726 is coupled to I/O devices 728 via one or more buses 729. Buses 729 may be serial buses, parallel buses, other buses known in the art, or a combination of these, depending on the type of I/O devices 728 coupled to computer system 70.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer implemented method to facilitate device tracking through use of a distributed ledger, the method comprising:
   receiving, by a device tracking system, an input from a user to register an electronic device for tracking, the input comprising registration data specifying the electronic device and one or more components in the electronic device to register for tracking and a minimum acceptance criterion for each of the one or more components, the minimum acceptance criterion for a registered component in the electronic device defines a minimum threshold percentage of votes needed to approve a modification to the registered component;
   generating, by the device tracking system, a device ledger data structure on a distributed ledger, the device ledger data structure comprising a device identifier that identifies the electronic device and registration data related to the electronic device, the registration data including the minimum acceptance criterion for each of the one or more components;
   generating, by the device tracking system, a rule execution set data structure for the device ledger data structure, the rule execution set data structure comprising one or more rules pertaining to approval of requests to modify the electronic device recorded by the device ledger data structure;
   receiving, by the device tracking system, a request to modify the electronic device or the one or more registered components in the electronic device;
   receiving one or more votes related to the request; and
   processing the request according to the one or more votes, the specified minimum acceptance criterion and the one or more rules.

2. The method of claim 1, further comprising generating a software defined lock for a component of the one or more components in the electronic device, the software defined lock configured to prevent modification of the component in the electronic device.

3. The method of claim 1, wherein the registration data specifies one or more voting weights, and wherein processing requests to modify the electronic device or the one or more registered components in the electronic device is based on the specified one or more voting weights.

4. The method of claim 1, wherein the rule execution set data structure indicates a minimum number of users that need to provide approval for any requested modification to the electronic device.

5. The method of claim 1, wherein the rule execution set data structure indicates whether a proxy voting feature is enabled.

6. The method of claim 1, wherein the rule execution set data structure indicates whether an approve by submitting device specific information voting feature is enabled.

7. The method of claim 1, wherein the rule execution set data structure indicates whether an approve by using provided link voting feature is enabled.

8. The method of claim 1, wherein the rule execution set data structure indicates whether an approve by providing a one-time password (OTP) voting feature is enabled.

9. The method of claim 1, further comprising:
   receiving, by the device tracking system, a request to remove a registered component from the electronic device;

receiving, by the device tracking system, one or more votes either approving or disapproving the request to remove the registered component from the electronic device; and in response to a determination to approve the request, updating, by the device tracking system, the device ledger data structure to reflect the approval of the request to remove the registered component from the electronic device.

10. A system comprising:

one or more non-transitory machine-readable mediums configured to store instructions; and one or more processors configured to execute the instructions stored on the one or more non-transitory machine-readable mediums, wherein execution of the instructions causes the one or more processors to:

receive an input from a user to register an electronic device for tracking, the input comprising registration data specifying the electronic device and one or more components in the electronic device to register for tracking and a minimum acceptance criterion for each of the one or more components, the minimum acceptance criterion for a registered component in the electronic device defines a minimum threshold percentage of votes needed to approve a modification to the registered component;

generate a device ledger data structure on a distributed ledger, the device ledger data structure comprising a device identifier that identifies the electronic device and registration data related to the electronic device, the registration data including the minimum acceptance criterion for each of the one or more components;

generate a rule execution set data structure for the device ledger data structure, the rule execution set data structure comprising one or more rules pertaining to approval of requests to modify the electronic device recorded by the device ledger data structure;

receive a request to modify the electronic device or the one or more registered components in the electronic device;

receive one or more votes related to the request; and process the request according to the one or more votes, the specified minimum acceptance criterion and the one or more rules.

11. The system of claim 10, wherein execution of the instructions further causes the one or more processors to generate a software defined lock for a component of the one or more components in the electronic device, the software defined lock configured to prevent modification of the component in the electronic device.

12. The system of claim 10, wherein the registration data specifies one or more voting weights, and wherein processing requests to modify the electronic device or the one or more registered components in the electronic device is based on the specified one or more voting weights.

13. The system of claim 10, wherein the rule execution set data structure indicates a minimum number of users that need to provide approval for any requested modification to the electronic device.

14. The system of claim 10, wherein the rule execution set data structure indicates one of whether an approve by submitting device specific information voting feature is enabled, whether an approve by using provided link voting feature is enabled, and whether an approve by providing a one-time password (OTP) voting feature is enabled.

15. The system of claim 10, wherein execution of the instructions further causes the one or more processors to:

receive a request to remove a registered component from the electronic device;

receive one or more votes either approving or disapproving the request to remove the registered component from the electronic device; and in response to a determination to approve the request, update the device ledger data structure to reflect the approval of the request to remove the registered component from the electronic device.

16. A computer program product including one or more non-transitory machine-readable mediums encoding instructions that when executed by one or more processors cause a process to be carried out for device tracking through use of a distributed ledger, the process comprising:

receiving, by a device tracking system, an input from a user to register an electronic device for tracking, the input comprising registration data specifying the electronic device and one or more components in the electronic device to register for tracking and a minimum acceptance criterion for each of the one or more components, the minimum acceptance criterion for a registered component in the electronic device defines a minimum threshold percentage of votes needed to approve a modification to the registered component;

generating, by the device tracking system, a device ledger data structure on a distributed ledger, the device ledger data structure comprising a device identifier that identifies the electronic device and registration data related to the electronic device, the registration data including the minimum acceptance criterion for each of the one or more components;

generating, by the device tracking system, a rule execution set data structure for the device ledger data structure, the rule execution set data structure comprising one or more rules pertaining to approval of requests to modify the electronic device recorded by the device ledger data structure;

receiving, by the device tracking system, a request to modify the electronic device or the one or more registered components in the electronic device;

receiving one or more votes related to the request; and processing the request according to the one or more votes, the specified minimum acceptance criterion and the one or more rules.

17. The computer program product of claim 16, wherein the process further comprises generating a software defined lock for a component of the one or more components in the electronic device, the software defined lock configured to prevent modification of the component in the electronic device.

18. The computer program product of claim 16, wherein the registration data specifies one or more voting weights, and wherein processing requests to modify the electronic device or the one or more registered components in the electronic device is based on the specified one or more voting weights.

19. The computer program product of claim 16, wherein the rule execution set data structure indicates one of whether an approve by submitting device specific information voting feature is enabled, whether an approve by using provided link voting feature is enabled, and whether an approve by providing a one-time password (OTP) voting feature is enabled.

20. The computer program product of claim 16, wherein the process further comprises:

receiving, by the device tracking system, a request to remove a registered component from the electronic device;

receiving, by the device tracking system, one or more votes either approving or disapproving the request to remove the registered component from the electronic device; and in response to a determination to approve the request, updating, by the device tracking system, the device ledger data structure to reflect the approval of the request to remove the registered component from the electronic device and sending a signal to the electronic device to release a software defined lock that was generated for the registered component in the electronic device.

* * * * *